United States Patent [19]

Szulinski

[11] 4,277,361
[45] Jul. 7, 1981

[54] VENTILATING SYSTEM FOR REPROCESSING OF NUCLEAR FUEL RODS

[75] Inventor: Milton J. Szulinski, Richland, Wash.

[73] Assignee: Atlantic Richfield Company, Los Angeles, Calif.

[21] Appl. No.: 793,659

[22] Filed: May 4, 1977

[51] Int. Cl.² .................. G21F 7/06; G21C 19/42
[52] U.S. Cl. ................................ 422/120; 176/37; 250/507; 252/301.1 W
[58] Field of Search ............ 252/301.1 W, 301.15; 176/37, 38; 250/506, 507

[56] References Cited

PUBLICATIONS

Bruce, F. et al., "Operating Experience with Two Radiochemical Processing Pilot Plants", Proc. 2nd U.N. Int'l. Conf. on Peaceful Uses Atom. Energy, Geneva, 1958, pp. 49–72.
Stoller, S. M. et al., *Reactor Handbook, vol. II: Fuel Reprocessing*, Interscience Publishers, Inc., N.Y., 1961, pp. 473–475, 524–527.
Corns, H. et al., "The New Separation Plant Windscale: Design of Plant and Plant Control Methods", Proc. 3rd Int'l. Conf. on Peaceful Uses Atomic Energy, Geneva, 1964, pp. 233–240.

*Primary Examiner*—Benjamin R. Padgett
*Assistant Examiner*—Deborah L. Kyle
*Attorney, Agent, or Firm*—John R. Ewbank

[57] ABSTRACT

In a nuclear facility such as a reprocessing plant for nuclear fuel rods, the central air cleaner discharging ventilating gas to the atmosphere must meet preselected standards not only as to the momentary concentration of radioactive components, but also as to total quantity per year. In order more satisfactorily to comply with such standards, reprocessing steps are conducted by remote control in a plurality of separate compartments. The air flow for each compartment is regulated so that the air inventory for each compartment has a slow turnover rate of more than a day but less than a year, which slow rate is conveniently designated as quasi-hermetic sealing. The air inventory in each such compartment is recirculated through a specialized processing unit adapted to cool and/or filter and/or otherwise process the gas. Stale air is withdrawn from such recirculating inventory and fresh air is injected (e.g. by the less than perfect sealing of a compartment) into such recirculating inventory so that the air turnover rate is more than a day but less than a year. The amount of air directed through the manifold and duct system from the reprocessing units to the central air cleaner is less than in reprocessing plants of conventional design.

5 Claims, 3 Drawing Figures

VENTILATING SYSTEM FOR REPROCESSING OF NUCLEAR FUEL RODS

RELATED INVENTIONS

Reference is made to the patent application of Milton J. Szulinski, Ser. No. 793,658, filed May 4, 1977 concerned with a "Fuel Rod Reprocessing Plant" and Ser. No. 793,660, filed May 4, 1977 concerned with a "Water Seal for Compartment for Reprocessing Fuel Rods" each of said applications being deemed here reiterated and incorporated herein.

FIELD OF INVENTION

This invention relates to the reprocessing of nuclear fuel rods, and to the plurality of ventilating systems by which air is cleaned prior to being discharged to the atmosphere.

PRIOR ART

It has long been known that the reprocessing of fuel rods could liberate radioactive gases such as radioactive krypton, tritium and iodine. Mists comprising droplets of solutions containing radioactive components can also be formed in a reprocessing plant. Air cleaning systems intended to remove at least a portion of the radioactive components prior to the discharge of ventilating gas to the atmosphere have long been used. In some nuclear facilities, difficult problems have been encountered in meeting the public health standards relating to the purity of the ventilating gas discharged into the atmosphere. The cost of retrofit modifications of ventilating systems has sometimes been a significant factor leading to the abandonment of nuclear facilities which at the time of the initial design, were thought to be providing adequate health protection.

Some radioactive components are so highly dangerous to health that remote control operation has been a preferred mode of operation. The difficulties of coping with emergencies and the restriction upon flexibility of operation inherent in remote control mode, has stimulated engineers to minimize the number of chambers in which remote control processes were conducted. Heretofore there has been a general propensity to minimize the number of TV cameras and/or other systems of control in monitoring remote control operations so that a series of reaction vessels and/or steps of a process might be contained within a single canyon. Shutdowns have thus sometimes been necessary because of malfunctioning of a single vessel in a canyon containing a plurality of vessels operated by remote control.

In a conventional chemical plant, it is customary to position a vessel above the floor which provides access to the variety of equipment. In the event of leakage of one vessel, the spill may extend over a significant area affecting a considerable variety of pieces of equipment.

In a conventional plant the clean-up from the spill of liquid is a nuisance but significant adaptability has been demonstrated in coping with such emergencies. At a nuclear facility, the contamination of equipment because of the spillage of liquid from a vessel can be significantly more complicated than in the ordinary chemical plant. Prolonged experience with nuclear facilities has shown that the malfunctioning occurs more frequently in the vessels and the processing equipment (e.g. valves) closely related to the vessels rather than in the piping between such operating units.

SUMMARY OF THE INVENTION

In accordance with the present invention, a nuclear facility such as a plant for reprocessing nuclear fuel rods, is provided with a ventilating system in which the central air cleaner for the zones for remotely controlled units is designed for relatively small flow rates. A manifold duct system supplies ventilating air to such central air cleaning unit from each of a plurality of remotely controlled compartments. Particular attention is directed to the fact that the air in each remotely controlled compartment is locally processed with a high ratio of gas recirculation. The fresh gas injection rate and the stale gas withdrawal rate are low so that the turnover rate of the air in such compartment is longer than a day but less than a year. Such slow turnover rate is designated as quasi-hermetic sealing of compartments. Each compartment is maintained in such quasi-hermetically sealed condition with a significant amount of recirculation and recycling of the inventory of air within such compartment. The air pressure within each compartment is controlled to be slightly lower than the air pressure in the area adjacent (usually above) such compartment. Automatic controls provide for the flow of fresh air or air from such adjacent area into the compartment when necessary to maintain such acceptable range of air pressure within the compartment. Similarly automatic controls provide for the withdrawal of ventilating gas from the compartment into the manifold duct system leading to the central air cleaner for the purpose of preserving such gas pressure in the compartment at the desired range below the air pressure adjacent the compartment. Whatever random variations in the atmospheric pressure in the access zones adjacent the remote control compartment may occur, may lead to withdrawal of the air at a rate corresponding to a replacement rate which for the moment may exceed the average replacement interval of more than one day. However, such random pressure variations are not frequent enough to bring about the turnover of the air inventory more than 365 times per year because the air pressure in such adjacent areas are regulated to maintain a substantially constant air pressure differential.

In modifications of the invention, the intake volume and exhaust volume for a compartment are controlled so that the marginal pressure difference between the air adjacent the remote control compartment and the air pressure within the remote control compartment can be broadened or narrowed to preserve an acceptable replacement rate. Supplemental gas injection and supplemental ventilating discharge control desirably are included with such volume monitoring system.

In the localized air processing unit, the air from the remote control compartment can be processed in any of the ways deemed appropriate for the processing and purification of air in a radioactive processing zone. For example, heat exchangers can be employed to cool the air inventory in the unit. Filters can be provided for the removal of mists and/or particulate material and for the control of the humidity of the air prior to its recirculation to the principal zone of the compartment. Of particular importance, the gas processing is custom-matched to respond to the problems attributable to the specialized processing conducted in that particular compartment. Thus iodine removal can be very complete close to the source of radioactive iodine evolution. This avoids dealing with iodine contamination of long ducts and decreases the problems of removing extremely diluted iodine from a large gas volume.

It is sometimes desirable to employ two duplicate facilities for the recirculation, pumping, cooling and filtering of the air for a compartment so that the compartment can continue to be operated during the time when attention is being given to the change of filters, caring for the maintenance or correcting any kind of malfunction in one of the two swing purifiers for the air recirculated within a remote control compartment.

The pumps employed for circulating the air within the remote control compartment and through the purifier and back into the remote control compartment provide a turnover rate for such air which is within a range from a few minutes to a few hours, but is significantly less than a day, whereby the assured circulation of air throughout all portions of the remote control compartment is achieved. The pressure within the remote control compartment is regulated to be within an appropriate narrow range slightly below the reference pressure, that is the pressure in the access zone immediately adjacent the remote control compartment. In some embodiments a stabilized regulated pressure isolated from the fluctuating pressure of the weather-influenced atmosphere is maintained in such access area. Ordinarily it is cheaper to maintain pressure differentials amongst the selected zones and to permit a series of zones to have pressures fluctuating according to a pattern resembling the weather induced fluctuations of atmospheric pressure. Such gas zone or air zone immediately adjacent the remote control compartment is the inside of a factory inasmuch as all portions of a reprocessing plant, including even the piping between processing units, are desirably protected from the atmosphere by appropriate walls and roofs for the fuel rod reprocessing facility. It is conventional to control the pressure of the air in every portion of such reprocessing facilities to be slightly less than the pressure of the exterior atmosphere so that if any air leakage occurs, such leakage will be from the atmosphere into the reprocessing facility rather than routinely permitting any air within the reprocessing facility to flow to the atmosphere except through the air cleaning systems. Thus the general effort is that of controlling the overall combination of ventilating systems so that air discharged to the atmosphere from the reprocessing facilities will be subjected to appropriate cleaners prior to such discharge.

An important feature of the use of the localized purifiers is that each local purifier can be adapted to cope with the particular problems of the processing unit which it serves. In some portions of a reprocessing plant, radioactive krypton may be involved. By isolating substantially all of the radioactive krypton in filters at the localized purifier, the degree of removal of krypton can be greater. The problems of dispersion of the radioactivity through the ventilating system can thus be decreased. The cost of operating the central air cleaner system for the remote control compartments of the reprocessing plant thus can be significantly reduced.

A crystalline zeolite having silver in the ion exchange position can be employed in filters adapted to capture radioactive iodine vapor in the air circulated through a local purifier. By filtering out a major portion of the radioactive iodine and/or other iodine vapor in the air of a remotely controlled compartment, the concentration and amount of iodine directed to the central air cleaner can be significantly decreased.

In most portions of the reprocessing plant in which trace amounts of gas containing tritium might be found, a water synthesis catalyst can be provided for converting all hydrogen, deuterioum, and tritium to water and the water can be directed to a purification system for the recovery of tritium and/or deuterium. Other types of filters adapted to capture radioactive hydrogen, i.e. tritium, can be utilized in the local purification zone.

In most portions of the reprocessing plant in which mists of aqueous solutions of radioactive components might exist, the purification zone can utilize appropriate demisting filters adapted for the separation of such mists from the recirculating air.

In preferred embodiments of the present invention, each remotely controlled compartment is located in a caisson maintained beneath a standard level at the reprocessing plant. Overhead cranes, rubber tired cranes and/or other appropriate vehicles are adapted to move within a vehicle access zone so that a cover can be removed from a caisson during times of construction, during times of monitoring of operations, or during times of maintenance or replacement of units. All pipe connections, valve manipulations, etc. in the reprocessing unit are remotely controlled, such as by crane operators. Not only the reaction vessels and processing units, but also substantially all valves and/or other components which might malfunction or leak are positioned within the caisson type compartment. A sump pit at the bottom of a compartment is provided with sensors sending emergency warnings in the event of leakage or malfunctioning. Certain compartments can also be provided with annular storage tanks beneath the sump pit. Drainage systems directing liquid from the sump pit toward appropriate storage in a remote area can be provided when desirable. The caisson cover for each compartment is separate from the cover for each of the purification units and/or pair of swing purification units. Thus there can be selective access to whatever processing unit may require attention while retaining the covers on the other compartments. Near the top of the compartments and just below the vehicle access zone a system of a series of pipes and related communication lines are connecting the various compartments. The vehicle access zone includes free space so that the cranes can manipulate the tools, vessels and/or other equipment which might need to be moved after start-up of the reprocessing facility. The general operation of the reprocessing plant is not interrupted by reason of making repairs to one of two swing units of an air purifier for a compartment.

The ventilating system for the access zone of the reprocessing plant, including the area about which the vehicles (e.g. overhead cranes) move to the covers giving access to the various air purification units and various processing compartments, can be maintained at a controlled and stabilized pressure differential. Inasmuch as some contaminants and mists may enter such zone at the time of opening a compartment and contamination can occur during periods of malfunctioning, any flow of air from the access zone to the atmosphere would be through the central air cleaner.

DESCRIPTION OF A PREFERRED EMBODIMENT

Figure 1:
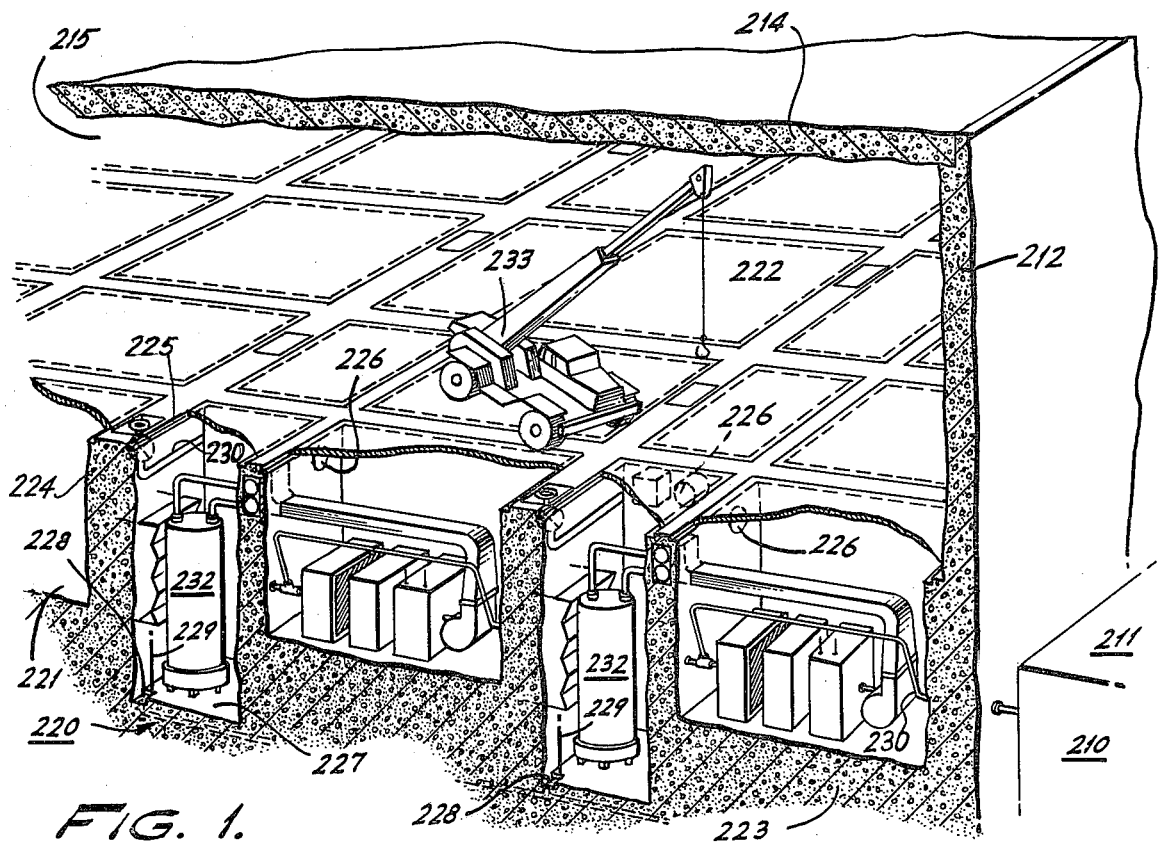
FIG. 1 is a schematic view of a reprocessing plant having a ventilating system.

Referring to FIG. 1, a reprocessing plant 210 includes a building 211 having side walls 212 and a roof 214 and a foundation 223. A vehicle access zone 215 permits mobile cranes 233 to move about on the covers 222 over compartments 221 arranged as an array of compartments 220, such as a rectangular array. A cover 222 is supported on a ledge 225 of a compartment wall 224. Openings 226 in vertical walls 224 permit communication lines 230 to extend from a compartment 221 to an appropriate zone.

The compartment 221 has a support floor 227 on which processing equipment 232 can be mounted. A detection system in a sump 228 monitors for leaks. When desired, drainage systems can conduct liquids from sump to a remote storage system. It might sometimes be appropriate to provide an annular storage tank for emergency storage of liquid drained from the sump.

Figure 2:
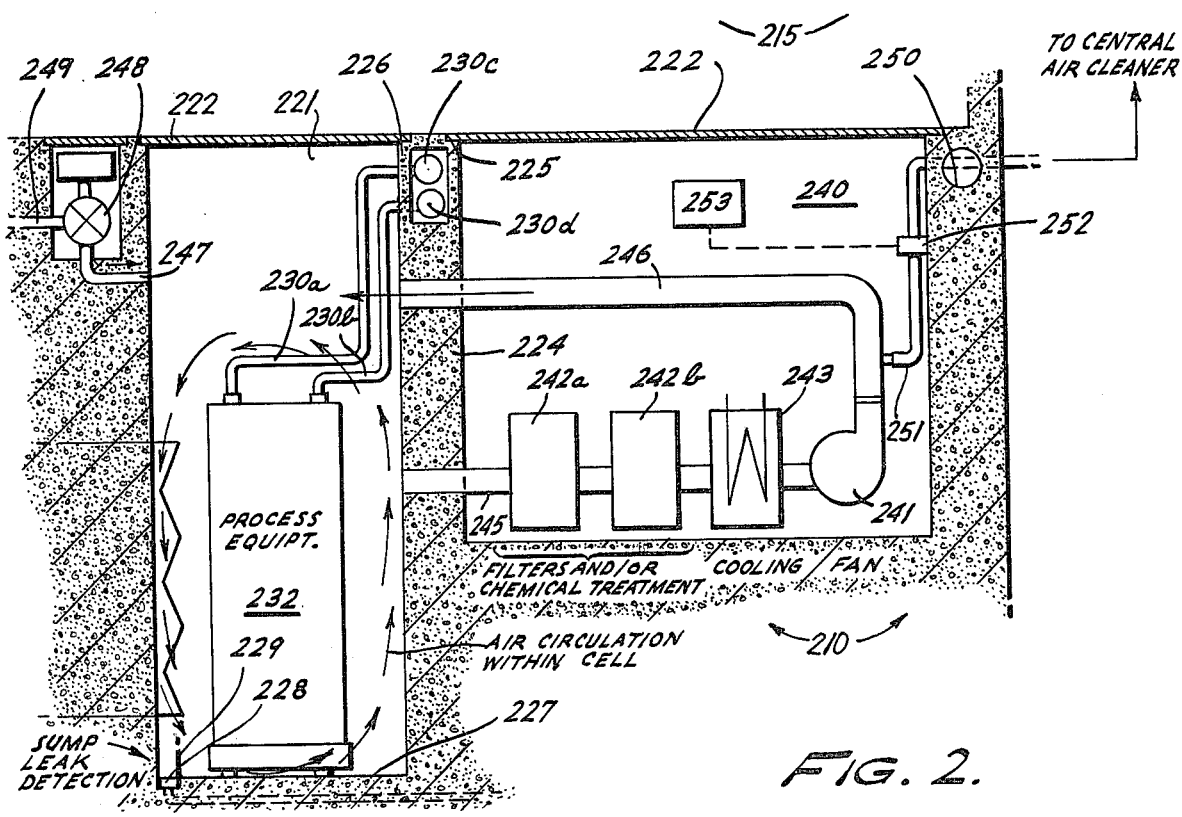
FIG. 2 is a schematic sectional view highlighting some of the relationships between an air treatment facility and a compartment in which there is equipment employed in the reprocessing system.

As shown in FIG. 2, an air processing facility 240 includes a fan 241 and a series of specialized filters 242a, 242b, and heat exchangers 243 for cleaning and cooling the air supplied to fan 241. Air is withdrawn from compartments containing process equipment 232 through a return duct 245 and directed to filters 242a, 242b, and to heat exchanger 243 adapted to cool the air prior to supply to the fan 241. A recirculating air duct 246 directs the air from fan 241 to compartment 220.

The covers 222 fit over compartments 221 in such a manner that some leakage is likely to occur even when the covers are not removed for a period of more than a year. The air pressure in the vehicle access zone 215 is greater than the pressure in compartment 221 whereby any air leakage that does occur tends to be from the vehicle access zone to the compartment rather than the other direction. The fan 241 maintains an air circulation of the air inventory of compartment 221 so that the air in compartment 221 can be treated as a quasi-hermetically sealed inventory of gas. The gas turnover rate is greater than one day but less than a year. Communication lines 230a, 230b, connect conduits 230c and 230d with process equipment 232.

A system of interconnected conduits and manifolds 250 direct dirty air to a central air cleaner of the reprocessing plant 210. Air is discharged from recirculating duct 246 in each air processing facility 240 to the central air cleaner manifold system 250 through the exhaust line 251 for maintaining the quasi-hermetic seal of compartment 221 so that the air turnover rate is more than a day but less than a year.

A turnover rate control 253 serves as a master control for maintaining the air circulation turnover rate within the range from about one day to about one year while also adjusting the pressure in compartment 221 so that often it is slightly less than the air pressure in the vehicle access zone 215. An air inlet 247 is connected to an air supply line 249 through a regulating valve 248 actuated by turnover rate control 253. A regulating valve 252 in exhaust line 251 (from facility 240 to manifold 250) is actuated by turnover rate control 253.

The schematic showing of FIG. 2 is concerned with the quasi-hermatic sealing of a particular compartment 221 and its interrelationship with its air processing facility 240. It should be recognized that each of the compartments in which there is equipment 232 for the processing of the compositions derived from the depleted fuel rods has its own air processing facility 240. The total reprocessing plant 210 includes a considerable variety of such compartments 221 having their corresponding air processing facilities 240.

Figure 3:
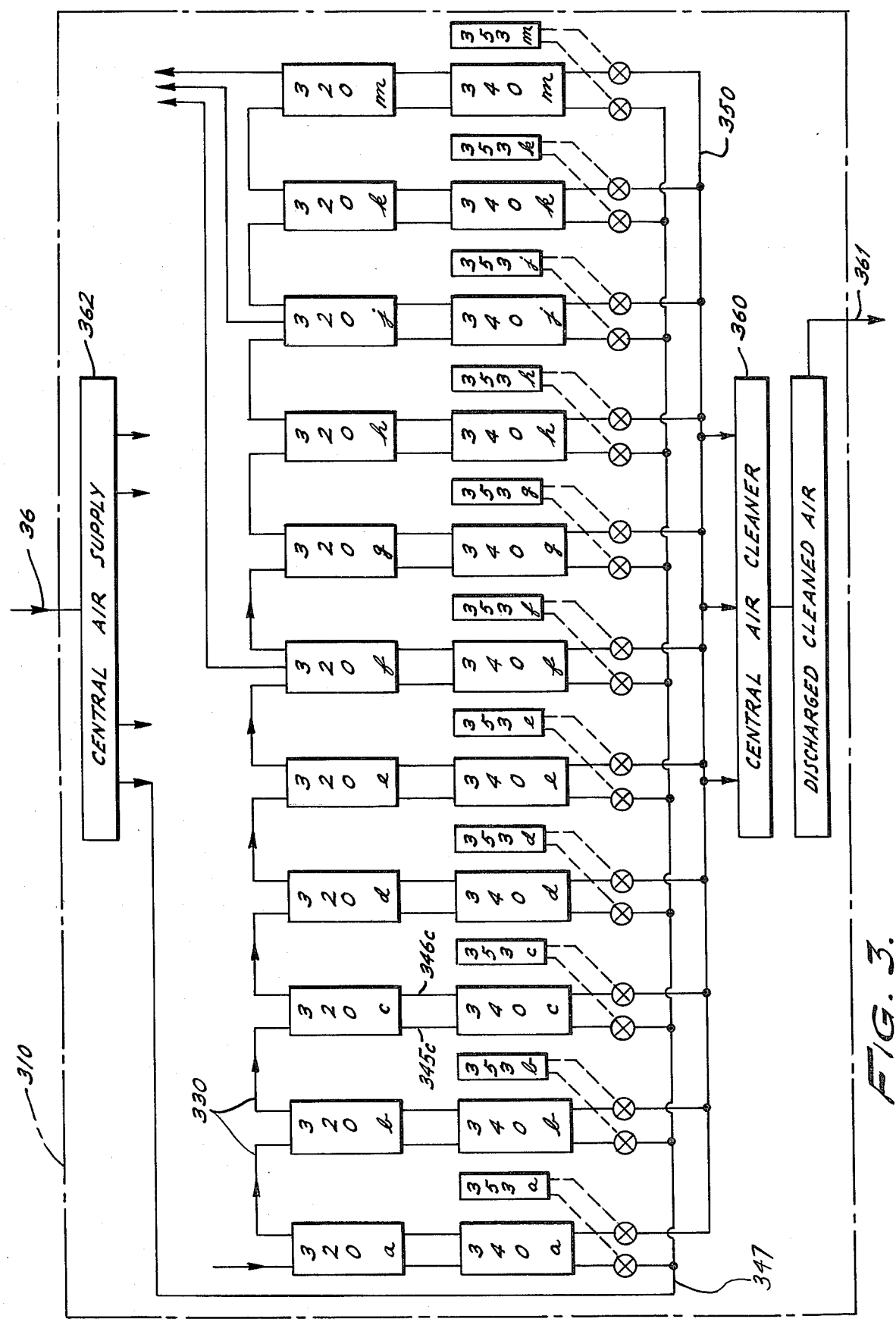
FIG. 3 is a schematic flow sheet connecting the flow of materials being reprocessed consecutively through a series of compartments, each compartment having its own air processing facility.

As shown in FIG. 3, a reprocessing plant 310 can have a flow sheet in which there are communication lines 330 amongst compartments 320a, 320b, etc., 320m, each containing processing apparatus. An air processing facility 340a, 340b, etc., 340m is associated with corresponding compartments 320, containing processing equipment. As shown in connection with 320, a return duct 345c can direct the air from the compartment 320c to the air processing unit 340c and the cooled and/or filtered air can be returned to the compartment through recirculating air duct 346c. Fresh air through line 347 can be supplied to an air processing facility 340 in response to signals from control system 353. Each compartment is maintained at a controlled differential pressure less than that of the nearby zone, ordinarily the vehicle access zone. Moreover, each control 353 regulates the gas exhaust rate so that the gas turnover in its compartment is more than a day but less than a year. The stale air is discharged from the air processing unit 340 to a manifold 350 and thence to a central air cleaner 360. Clean air is discharged to the atmosphere through a vent 361.

Various modifications of the invention are possible without departing from the scope of the appended claims.

I claim:

1. In a reprocessing plant for depleted fuel rods, the combination of:

a plurality of quasi-hermetically sealed compartments in which appropriate steps of the reprocessing are conducted;

an air processing facility for each said quasi-hermetically sealed compartment;

at least one means for introducing air into the combination of said quasi-hermetically sealed compartment and its air processing facility;

an exhaust manifold system for withdrawing stale air from each of a plurality of said quasi-hermetically sealed compartments and directing such stale air to a central air cleaner;

a central air cleaner for the stale air collected by said exhaust manifold system;

turnover rate control means for each said quasi-hermetically sealed compartment maintaining the air inventory turnover rate in said combination of quasi-hermetically sealed compartment and its air processing facility at one turnover in a time interval greater than one day but less than one year, such turnover rate defining the quasi-hermetic sealing of the compartment; and filtering means and cooling means in each said air processing facility adapted uniquely to deal with the air characteristics recirculated to its corresponding quasi-hermetically sealed compartment.

2. The reprocessing plant of claim 1 in which at least one specialized air processing facility includes means for filtering iodine vapor whereby the air entering the exhaust manifold system contains significantly less radioactive iodine than if such localized filter were not used.

3. The reprocessing plant of claim 1 in which at least one specialized air processing facility includes means for filtering krypton, whereby the air entering the exhaust manifold system contains significantly less radioactive krypton than if such localized filter were not used.

4. The reprocessing plant of claim 1 in which at least one specialized air processing facility includes means for filtering tritium, whereby the air entering the exhaust manifold system contains significantly less tritium than if such localized filter were not used.

5. The reprocessing plant of claim 1 in which at least one specialized air processing facility includes means for filtering compounds containing carbon, whereby the air entering the exhaust manifold system contains significantly less carbon-14 than if such localized filter were not used.

* * * * *